June 1, 1937.  J. BIJUR  2,082,770
LUBRICATION
Filed May 8, 1933   2 Sheets-Sheet 1
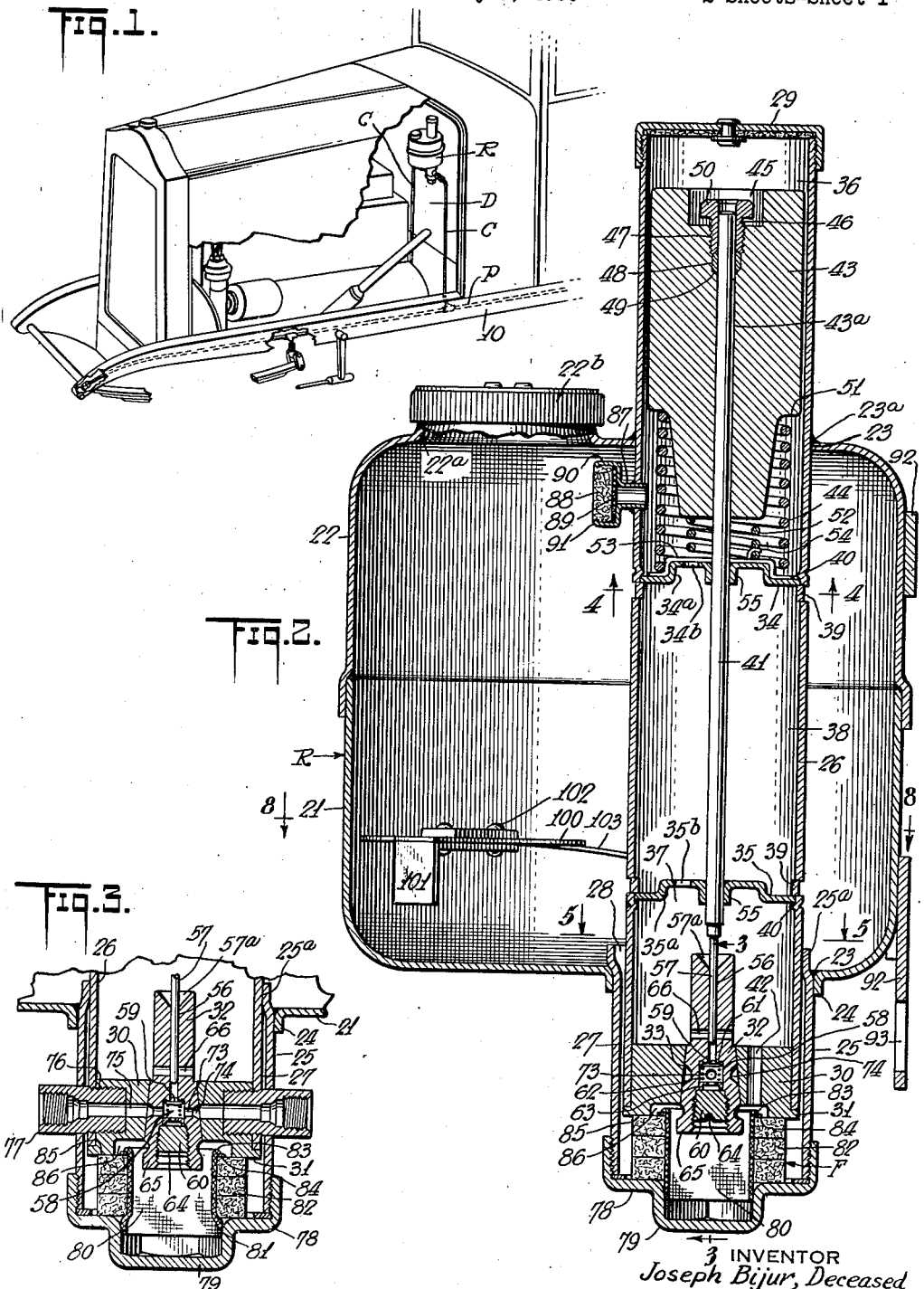
INVENTOR
Joseph Bijur, Deceased
By George Bijur, Executor
Dean, Fairbank, Obright & Hirsch
his ATTORNEYS June 1, 1937. J. BIJUR 2,082,770
LUBRICATION
Filed May 8, 1933 2 Sheets-Sheet 2
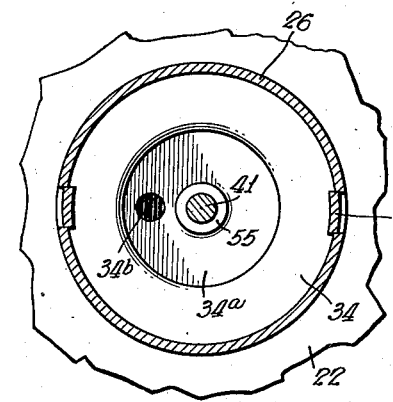
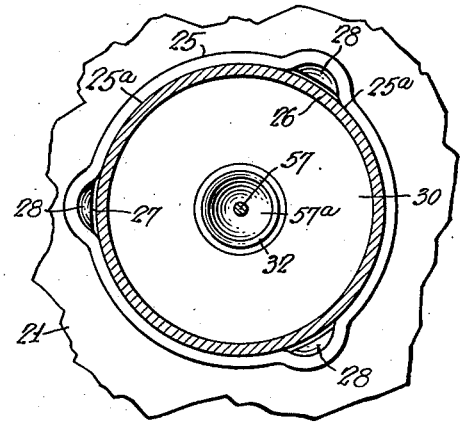
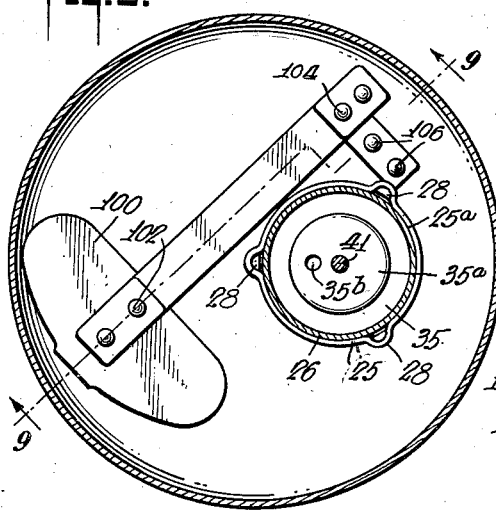
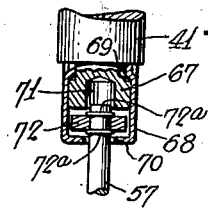
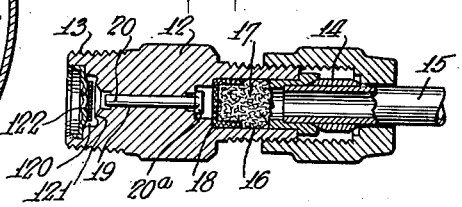
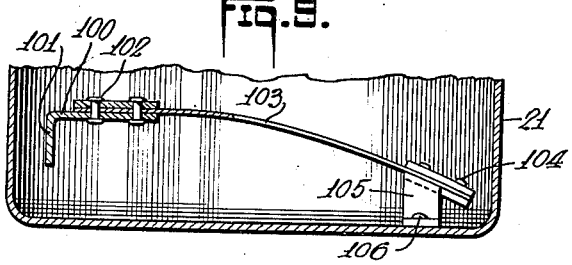
INVENTOR
Joseph Bijur, Deceased
By George Bijur, Executor
his ATTORNEYS Patented June 1, 1937

2,082,770

UNITED STATES PATENT OFFICE 2,082,770

LUBRICATION

Joseph Bijur, deceased, late of New York, N. Y., by George Bijur, executor, New York, N. Y., assignor to Auto Research Corporation, a corporation of Delaware Application May 8, 1933, Serial No. 669,958. In Great Britain June 8, 1929

41 Claims. (Cl. 184—7)

The present invention, while having a wide range of applicability, is primarily concerned with lubricating installations of the character in which oil from a central reservoir is fed through a distributing conduit system to the various bearings of a machine to be lubricated.

The invention finds its preferred use in an automatic lubricating installation for vehicle chassis bearings of the type in which a liquid filled conduit system has restricted flow proportioning outlets at the bearings and oil in minute quantities is continuously fed into the system by a force pump.

The invention is further especially concerned with the construction of improved pump mechanism and the provision of an improved unitary reservoir, pump and pump motor assemblage which, while capable of many uses, is especially effective as the lubricant storage and feed control means of a system of the above type.

An object of the invention is to provide a fully automatic lubricant distributing system, in which the continuous force feeding mechanism is devoid of hinging parts or speed reducing mechanism and the power for feeding is applied directly on the lubricant to be fed without the use of intervening translating devices to complicate the mechanism.

Another object is to provide a system which is silent in operation, which delivers proper quantities of lubricant at the bearings independently of temperature conditions or consequent variations in oil viscosity, and assures, under all operating conditions the application of an adequate but not unduly excessive amount of oil at the bearings.

Another object is to provide a reservoir, pump and pump motor unit of light, rugged, durable construction, consisting of but few parts, capable of ready assembly and which permits the use of relatively light metal shells for the reservoir and motor pump housings with a relatively massive inertia weight as the motive means for the pump, yet effectively prevents rattle or jamming of the weight or injury to the reservoir or motor casing or pump and motor connections either in operation or during transit or storage.

Another object is to provide a unit of this character in which all of the moving parts are completely housed, protected against tampering, inclosed against the access of dust and thoroughly lubricated by clean oil without the use of accessory fittings.

Another object is to provide a unit in which the motor and pump are capable of assembly as independent units, and even though a massive inertia weight and heavy connecting rod are used to reciprocate a small bore plunger, to obviate the need for great accuracy in manufacture or assembly.

The pump is of such minute capacity that it might prove unreliable for producing sufficient suction to draw a charge through the relatively dense filter which is preferred for thorough cleansing of the oil. By relying upon gravity flow, however, and using a filter which is dense but of comparatively great area, the supply of oil to the pump is assured. This filter moreover is applied in advance of the pump inlet as an incident of assembling other parts of the mechanism and is readily accessible for purposes of cleaning or replacement.

In a preferred embodiment of the invention, the inertia motor and the pump are mounted at the top and bottom respectively of an elongated cylindrical housing adapted to extend through and project beyond the top and bottom of a small reservoir or to be bodily emplaced or partially submerged in a large reservoir. The pump is preferably of the unpacked, self-porting plunger type and of minute capacity. Its small diameter plunger is directly connected by a heavy rigid connecting rod to a relatively massive inertia weight which constitutes the motive means and which is held in free-floating position by a spring. Partitions in the elongated motor and pump casing serve to segregate the motor mechanism from the pump mechanism and to provide substantial bearings for the connecting rod, these bearings being well lubricated by direct immersion in filtered oil standing in the housing or by creeping of filtered oil to them. The rigid, non-bending connecting rod permits the motor weight to fit its casing closely enough to obtain a substantial air checking effect without danger of rattling of the weight against its casing walls.

The motor and pump casing or housing is provided with an inlet in its bottom effectively guarded by a dense filter of large area. Oil draining by gravity from the reservoir and through this filter rises in the pump and motor casing immersing the pump and one or more of the connecting rod bearings. The possibility of air blocking in this casing is avoided by the provision of means for venting back into the reservoir, the vent passage including an air-pervious filtering medium which effectively guards against the entrance of dust or unfiltered oil to the pump parts.

The generally cylindrical casing which houses the pump and motor, while passing directly through the reservoir does not materially lessen the capacity of the latter since the casing itself serves as a reservoir for clean oil seeping through the filter from the main reservoir.

A special connection between the heavy connecting rod and the light plunger automatically compensates for slight axial misalignment of these elements and avoids the need for precision in manufacture or assembly.

The invention may be more fully understood from the following description of the accompanying drawings wherein:

Fig. 1 is a fragmentary perspective view of an automobile chassis with part of the hood broken away to show the chassis lubricating installation.

Fig. 2 is an enlarged vertical sectional view through the reservoir, pump and motor unit.

Fig. 3 is a vertical sectional detail through the pump taken at right angles to Fig. 2 and on the line 3—3 thereof.

Fig. 4 is a transverse sectional view on the line 4—4 of Fig. 2.

Fig. 5 is a transverse sectional view on the line 5—5 of Fig. 2.

Fig. 6 is an enlarged view partly in elevation and showing in section the connection between the pump plunger and its connecting rod.

Fig. 7 is a sectional view through one of the flow-controlling outlets of the distributing system.

Fig. 8 is a slightly reduced transverse sectional view on the line 8—8 of Fig. 2, and Fig. 9 is a vertical sectional detail taken approximately on staggered line 9—9 of Fig. 8.

Fig. 1 shows a fragment of a typical installation of my automatic lubrication system. The improved reservoir pump and motor unit R is mounted upon the dash board D of the car and delivers lubricant under pressure into two conduit branches C leading to the main pipes P, extending along the channel chassis frame bars 10 of the car and supplying lubricant to the various chassis bearings through suitable high resistance flow proportioning outlet branches, the flow resistance of which is preferably embodied in a drip plug of the character now to be presented, or of any of various other constructions.

The drip plug illustratively shown consists of a body portion 12 having one end threaded at 13 for application to a receiving socket (not shown) in the bearing and having its other end connected as by a compression coupling 14 to a pipe 15 of the distributing system. The coupled end of the member 12 is provided with a socket 16 therein encasing a wad of felt or equivalent filtering material 17 confined within a suitable wire basket 18. The bore 19 extending from the socket 16 to the end of the body is substantially filled with a flow restriction pin 20 having a head 20ª disposed in the socket 16 to prevent axial displacement of the pin. A flap valve 120 working against an outwardly facing seat 121 in the base of the fitting and retained against loss by a perforated disk 122, serves to prevent siphoning through the conduit lines where the drip plugs are located at materially different levels.

In practice the bores 19 of all of the drip plugs are of the same diameter but the plugs are rated, their flow resistance or proportionate rate of feed being determined by the diameter of their restriction pins. Thus flow to all of the bearings is continuous but in proportions determined in accordance with the requirements of the individual bearings by the selection of properly rated plugs.

The present invention is more particularly concerned with the construction of the reservoir, pump and motor unit which serves as a central lubricant source and as the means for continuously and automatically feeding lubricant under pressure into the conduit system during normal running of the car.

The reservoir consists of a pair of light-gauge generally cup-shaped stampings 21 and 22, the mouths of which are telescoped and welded or soldered together in liquid-tight relationship. The upper inverted cup 22 is provided with a filling neck 22ª closed by a vented cap 22ᵇ. Aligned openings 23 of substantial diameter are provided in the top and bottom of the reservoir. A pendant flange 24 encircles the lower opening and has the upper end of a depending sleeve member 25 soldered or otherwise secured therein. This sleeve is closed at its bottom by a detachable cap 78.

The pump and motor casing includes an elongated cylinder 26 extending completely through the reservoir, with its upper end projecting a considerable distance thereabove and its lower end extending some distance into the sleeve 25. Cylinder 26 is soldered at 23ª into the upper opening 23 and is force fitted or soldered into the inwardly turned upper end of the sleeve 25 as indicated at 25ª. Except for this inwardly turned top portion, the sleeve 25 is slightly larger in internal diameter than the external diameter of the cylinder 26 thereby leaving an annular space 27 between the cylinder and sleeve into which oil may flow from the reservoir through notches 28 struck outwardly at a plurality of (usually three) points in the top edge of the sleeve 25. These spouts aid materially in taking the downward thrusts to which the sleeve may be subjected.

The cylinder 26 is closed at its top by a flanged cap 29 and at its bottom by a block 30 force fitted therein, this block including a flange 31 to abut the lower end of the cylinder and being welded or soldered in place if desired. The pump body 32 includes a tapered intermediate portion force fitted into a tapered receiving bore 33 in the block 30.

Upper and lower partition disks 34, 35 of identical construction extend transversely of the cylinder 26 and with the cap 29 and the block 30 subdivide the cylinder into three chambers. The uppermost chamber 36 houses the motor, the lowermost chamber 37 may be termed the pump chamber and the central chamber 38 between the partition disks serves as a reservoir. The disks 34, 35 have their edges confined between partial shears 39 in the cylinder walls and inwardly struck projections 40 in such walls. At their centers they are apertured and flanged at 55 to provide substantial bearings for the sliding movement of a relatively massive reciprocatory connecting rod 41 which transmits power from the motor to the pump.

Before describing the motor and pump mechanism in detail it may be noted that the flow of oil from the reservoir to the pump is by gravity into the space 27, through a filter F from whence, seeking its own level, the oil flows up through passageway 42 in the block 30, submerging the pump and rising in the cylinder 26. This cylinder thus serves as a reservoir for filtered oil which normally stands therein at about the same level as that of the oil in the main reservoir R as will be readily understood. Since the pump is dropped well below the bottom of reservoir R, however, the main reservoir may be completely evacuated by gravity and a small emergency column of filtered oil will still remain in the lower end of cylinder 26.

Considering now the motor mechanism, the upper end of connecting rod 41 extends through a bore 43ª in a relatively massive inertia weight 43, and is fixed to the weight, the latter being sustained in free floating position by coiled supporting spring 44 and deriving energy from the vibration incidental to normal running of the car. This spring reacts against disk 34.

One convenient means for coupling the weight and connecting rod is illustrated. The top of the weight is recessed at 45 and a bushing 46 encircling the connecting rod and screwed in the threaded upper end 47 of a socket in the bottom of this recess, acts on a compression coupling member 48 in the unthreaded tapered socket bottom 49 to cause such member to grip the rod and weight and secure them together. Recess 45 accommodates the tool receiving head 50 of the bushing.

Disks 34, 35 are formed with central circular upstruck portions or offsets 34ª, 35ª having openings 34ᵇ, 35ᵇ therein. The offset 34ª of the upper disk serves to center the spring 44. Weight 43 throughout its upper portion is cylindrical and of less diameter than the cylinder 26 and near its lower end is undercut to provide a downwardly facing shoulder or seat 51 resting on the spring 44. Below this shoulder, the weight is of inverted frusto-conical shape, lying within spring 44 and having its flat lower face engaged with a short coiled buffer spring 52 affording high resistance to violent down strokes of the weight. A disk or strap 53 overlying the upper face of disk 34 and conforming to its contour is formed with one or more outstruck fingers 54 to grip the lowermost convolution of buffer spring 52 and hold the latter against displacement.

The rigidity of connecting rod 41 and the substantial bearings therefor afforded at 55 substantially prevent lateral wabble of the weight in operation. Consequently there is no rattle or knocking and the space between the weight and cylinder may be small enough to permit substantial air checking by compression and expansion of the air between the cap 29 and weight 43 at times when unusually violent vibrations occur. The rigidity of the connecting rod and its bearings furthermore effectively braces this rod against warping during storage and shipment of the units even though the rod be disposed horizontally during such periods.

Referring now to the pump, body 32 is formed with a longitudinal bore 56 extending therethrough and with an unpacked self-porting plunger 57 sliding therein. The lower portion of this bore opens out into a valve chamber 58 within which the outlet valve 59 is accommodated. Therebelow bore 56 is further enlarged to accommodate a sealing plug 60, screwed home to plug the lower end of the bore. The valve 59 is held pressed upwardly against a downwardly facing seat 61 by coiled expansion spring 62 reacting against a disc 63 force fitted into the bottom of chamber 58. Plug 60 is formed with a screw driver slot 64 permitting its tight assembly and ready removal, and a head 65 formed on the lower end of the body is adapted to receive a suitable tool for withdrawing body 32 from block 30.

A transverse bore intersecting bore 56 provides a pair of inlet ports 66 for the pump, that portion of the bore 56 between ports 66 and valve 59 defining the pump cylinder proper and that portion of the bore 56 above ports 66 serving merely as a guide for the plunger 57.

The plunger 57 (Fig. 6) is so connected to rod 41 that slight misalignment of these elements becomes immaterial. The connection permits the axes of plunger and rod to lie in non-coincident parallel planes. The lower end of rod 41 is reduced at 67 and a cup 68 fitting and extending below the reduced portion 67 is swaged over at its top into a groove 69 in such portion. The cup bottom is formed with a central opening 70 therein of greater diameter than the plunger 57 and a socket 71 of diameter equal to that of the opening 70 is formed in the lower face of the rod extension 67. Plunger 57 extends through opening 70 and slightly into socket 71 and carries a fixed head 72 held between upsets 72ª on the plunger. The diameter of this head is greater than that of the opening 70 and less than the internal diameter of the sleeve. There is thus provided a plunger and rod connection accommodating for relative lateral displacement of rod and plunger.

As best seen in Fig. 3 the chamber 58 is provided with diametrically opposite ports 73, communicating with an annular groove 74 in the exterior of body 32, which in turn communicates with radial passageways 75 in the block 30, opening into sockets 76 into which are screwed fittings 77 to which the pipe lnes C, C are adapted to be connected. The sleeve 25 and cylinder 26 are apertured to snugly accommodate these fittings. By using the annular groove 74 there is no need to align ports 73 and passages 75 as the pump body 32 is assembled in the block 30.

The filtering means is preferably carried by the flanged cap 78 screwed onto the lower end of sleeve 25 and having a polygonal depression furnishing a tool receiving boss 79 at its bottom. A cylinder 80 of wire mesh has its lower end pressed out at 81 and soldered into this depression. A series of felt filter rings 82 slipped over the cylinder 80 stack one upon the other to form an internally reinforced cylindrical filter. The top of the cylinder 80 is spun over at 83 upon a washer 84 lying on the inner edge of the uppermost washer 82 and accommodated in a recess 86 in the bottom of block 30. As the cap 78 is screwed home the outer edge of the filter is forced against ledge 85 about recess 86.

To vent the cylinder 26 and preclude air blocking therein, yet at the same time exclude the entry of dust, I screw or solder a tube 87 into the cylinder just below the reservoir top. An air pervious filter pad 88 backed by screen 89 is held in the enlarged mouth 90 of the tube by spinning the latter inwardly to form a retaining lip 91. Thus the vent permits free flow of air therethrough but prevents ingress of dust or unfiltered oil into the storage cylinder 26. This is true even though the pad 88 is wet with oil due to sloshing around of the latter during travel of an automobile over rough roads.

To attach the reservoir R to the dashboard or other support, attaching brackets 92 are spot welded to the cups 21 and 22 and apertured at 93 for the reception of suitable securing devices (not shown).

The operation of the device is as follows. The reservoir is filled with oil through neck 22ª. This oil flows downwardly through mouth 28 into passageway 27 and into the bottom of sleeve 25. It seeps through the filter F and rises through recess 86 and passage 42 into the chamber 37, immersing the pump and rising through opening 35b into chamber 38 where it partially immerses the connecting rod 41. The valve 59 prevents flow of oil out of the pump cylinder which is normally kept full by gravity flow through ports 66.

When the motor car is started the normal vibration incidental to its running will impart a jiggling movement or irregular reciprocation to the floating weight 43 and the connecting rod 41 to which it is fixed, this motion being transmitted through the connection above described to the plunger 57 which is alternately retracted to permit oil to flow through ports 66 into the cylinder and rammed home to force all or part of the pump charge past the valve 59 and into the distributing system. This continuous force feed of minute charge of lubricant maintains a substantially continuous flow of oil to the chassis bearings through the flow proportioning fittings of Fig. 7. No lubricant will escape when the car is not in motion, since the valve 59 is then seated and prevents drainage of oil from the reservoir into the system, and consequently precludes the venting that would promote drainage from the system.

Obviously the only cause for oil flow through the filter is a difference in head at the opposite sides thereof. During continuous running the level in the cylinder may fall somewhat below the line in the reservoir but the greater the fall the greater the inducement to flow through the filter. Whatever small quantity of oil may be used from the cylinder during a day's run, liquid levels within and without the cylinder will have substantially equalized each other by seepage during a night's parking.

Usually the lower connecting rod bearing is immersed in oil and the upper connecting rod bearing is kept wet by the creeping of oil in the chamber 38. Oil furthermore creeps upwardly along the wet rod 41 and at times splashes through hole 34b so that adequate lubrication of the upper connecting rod bearing is substantially assured.

The pump delivers an average volume adequate for all speeds and all road conditions without under-oiling at any time and without excessive over-oiling where bumpy roads are encountered. Due to the high pump pressure available, changes in oil viscosity due to temperature variations are not sufficient to affect the volume of oil delivered.

Even when the reservoir has been substantially emptied of oil through continued pump operation, and flow into cylinder 26 there will still be a head of filtered oil available at the pump which will serve as an emergency supply until the reservoir can be refilled. This head is equal to the difference in height between notches 28 and inlet ports 66 and represents a considerable quantity since the lower end of the filtered oil storage cylinder 26 is of substantial diameter.

In order to give timely notice to the operator of the need for a fresh supply of lubricant, there is employed an audible alarm which will give a low level indication in an unmistakable manner, yet not so obtrusively as to annoy the operator or passers-by. In Figs. 1, 8 and 9, this signal is illustratively shown as a clapper member of the inertia operated type, normally maintained silent by the damping action of the lubricant in the tank but adapted to strike against the tank bottom as the level of the liquid falls.

This member may conveniently comprise a stamped metal weight 100 horizontally disposed and preferably segmental in plan for damping action. This weight is provided with a downwardly extending clapper tongue 101, adapted to strike the reservoir bottom, riveted at 102 to an end of flexible leaf spring 103 extending generally horizontally across the reservoir and anchored at its opposite end by rivets 104 to an inclined bracket 105 which in turn is riveted at 106 to the reservoir bottom.

Figs. 1 and 9 show the normal position of the clapper, whether the reservoir be full or empty. The stiffness of the spring leaf 103 is such that the inertia of its clapper weight 100 under normal operation of the vehicle, on an average road, with the reservoir empty or nearly empty, will produce no substantial sway until the vehicle strikes a sharp bump or other substantial irregularity in the road. When such a bump is encountered the clapper, acting by inertia, will strike the floor of the reservoir. The consequent sound somewhat resembles a distant cow bell, and by reason of its infrequent occurrence, is more desirable as a signal than a continuous, annoying staccato alarm.

It will be understood, of course, that when the reservoir is filled with lubricant the clapper is effectively damped against striking even under severe shocks and that the noise which it makes as the oil level falls will become increasingly loud and give a more and more insistent alarm in the event of continued neglect to refill.

The construction above described is not only characterized by extreme simplicity of construction, but by a remarkable capability of expeditious and convenient assembly. For instance, the motor unit, the pump and the connections therebetween may be preassembled within the cylinder 26 before the latter is attached to the reservoir. The pump plunger is attached to the rod 41 and guided into the bore 56 by guiding socket 57a, accurate alignment of pump and weight being rendered unnecessary by the loose connection between the pump plunger and the connecting rod.

The pump body 32 may be mounted in its block 30 before the latter is fitted into the cylinder 26. The vent may be applied to cylinder 26 before assembly of the two sections of the reservoir shell or may be later applied through the conveniently adjacent filling spout. The filter is completely assembled upon the lower cap 78 and correctly positioned merely by screwing this cap home.

The correct positioning of the lower end of the plunger relatively to the inlet ports may be readily accomplished by inserting a stop fixture into the lower end of the bore 56 and letting rod 41, 57 rest directly upon it. The weight 43 is then fully depressed and the coupling unit 46 screwed home. Thus the maximum working stroke of the plunger is determined. When the weight is released and raised by the spring 44 the lower end of plunger 57 will be at the inlet port 66, the strength of spring 44 being predetermined with sufficient accuracy to assure this.

With this adjustment made at the factory prior to the assembly of the pump outlet valve, no adjustments during use are necessary. In fact the apparatus is designed so that the adjustable mechanism is inaccessible and proof against tampering.

The direct connected inertia pump of the present application is particularly advantageous inasmuch as it may be utilized to feed a central chassis lubricating system of the drip plug distributing type with a supply of lubricant which will be correctly metered in accordance with the bearing requirements.

In this respect the pump of the present application differs from other inertia devices, such as, for example, those disclosed in the Davis patents, No. 1,735,733 and No. 1,779,208.

It has been found in order to provide a direct connected inertia pump for a central chassis drip plug lubricant distributing installation, that the mass of the inertia weight, the character of the supporting spring, the diameter of the plunger, its length of stroke, its rate of reciprocation and its delivery must all be critically controlled.

For example, the plunger should have a diameter of about $\frac{1}{16}$ of an inch and should not be without the range of 0.040 to 0.080 inch. The stroke should be about $\frac{1}{16}$ of an inch and also should not depart from the range of 0.040 to 0.080 inch. The number of oscillations should vary within the range of 100 to 200 per mile or from 30 to 100 a minute. The pump should deliver from 0.005 to 0.0025 c. c. per stroke or more preferably from 0.001 to 0.002 c. c.

Ordinarily the pump should be so regulated as to deliver about 4 or 6 or 8 c. c. per hour respectively, for 20 or 30 or 40 chassis bearings. The mass of the weight should preferably be maintained within the range of ½ to 1 pound, while the spring should be subject to initial compression of about ½ to 1½ inches when it is caused to support the weight. The spring and the weight are so proportioned that the vertical acceleration should be much less than gravity and have the order of about 5 feet per second per second.

When the pump is constructed in accordance with these requirements, the weight will reciprocate with the same frequency as the plunger to feed lubricant continuously into the distributing system and causing such distributing system to feed past the drip plugs into the chassis bearings. It will be noted that the frequency of the weight and of the plunger are also substantially the same as that of the oscillating chassis bearings, particularly the spring hinge and shackle bearings.

As a result the amount of lubricant will at all times be fed to these bearings substantially in proportion to the amount of rotation or the number of oscillations thereof. The pump when so proportioned and constructed will deliver the proper amount of lubricant to the system substantially regardless of the viscosity due to varying atmospheric temperature from winter to summer, even though the back pressure ranges from ½ pound in summer to about 100 pounds in winter. The relative energy generated by the weight is so much greater than the energy consumed in pumping the lubricant into the chassis distributing system, that assurance is had of predetermined discharge by the pump over the entire pressure range from summer to winter conditions.

As is evident it is necessary to use a very light delicate plunger and a relatively heavy massive weight. By reason of this construction it is necessary that the delicate plunger be guided over substantial length at all times and that it be substantially elongated to have a length of about 1 inch or more. Moreover, the plunger should be attached to the connecting rod in such a way as to permit a susbtantial play of such plunger in respect to the connecting rod.

In the present application a rocking connection between the plunger 57 and the connecting rod 41 is shown in Fig. 6 but it is obvious that other types of connection might be readily employed. In addition the weight must be steadied independent of the piston. In the construction of the present application the piston 57 is steadied in the cylinder block 32 while the weight is steadied by providing the bearings 55 for the connecting rod 41. The weight may also be steadied by providing a pivotal or arm connection therefor instead of the longitudinal bearings 55.

In the construction of the present application it is necessary to provide a convenient adjustment at the top of the weight as shown in Fig. 2, and as shown the extension from the upper part of the connecting rod 41 extends through the weight to the top thereof where an adjusting nut arrangement 50 is provided. The connecting rod 41 may either be in one or two parts and the portion thereof extending through the weight 43 might well be pivotally connected to the portion extending downwardly through the cylinder 26.

A very important feature of the present invention resides in the fact that the plunger 57 is adjusted so that it will just close the inlet port 66 when the spring 44 and the weight 43 are properly balanced and in at-rest position. When the chassis or the automotive vehicle is moving, the plunger 57 will reciprocate at the frequency of the weight on both sides of the lower portion of the port 66. It will be noted that substantially one-half of the stroke of the plunger is idle, when the plunger is above the inlet port 66 when the lower portion of cylinder 56 below the port 66 is receiving its charge of lubricant. By having the plunger reciprocate idly in the upper portion of its stroke without forcing lubricant into the chassis system, assurance is had that the plunger will pick up substantial velocity when it passes downwardly across the inlet port and ejects lubricant from the lower portion of the cylinder 56 into the chassis distributing system. It is extremely desirable that the plunger be moving with substantial maximum velocity when ejecting lubricant into the line. This occurs at the middle of the downward stroke.

It has also been found that the rate of discharge of the pump of the present invention bears a most desirable relation to the resiliency of the drip plug distributing system, so that a steady continuous feed is obtained without pulsation. In a chassis distributing system, such as shown in the present application, the critical value of pump discharge is between 0.1 to 1.0 c. c. since, if a much greater volume than the critical volume is discharged, a pulsating or intermittent discharge will be obtained. Since the pump of the present invention per stroke discharges between 1/15 to 1/50 of a drop or about 0/001 c. c., the resiliency of the line most conveniently accommodates itself to this discharge of the pump to give a substantially steady discharge through the drip plugs throughout running of the vehicle.

The present application is similar in subject-matter to applications Serial No. 285,526, Serial No. 352,744 and Serial No. 398,839, its drawings being substantially identical with the drawings of application Serial No. 398,839, all of these applications disclosing inertia pumps with thin elongated plungers for feeding a drip plug lubricating system.

What is claimed is:

1. A reservoir, pump and pump motor unit, including a reservoir chamber, an elongated casing extending vertically through said reservoir, a pump at the lower end of the casing and a motor at the upper end thereof, operative connections between pump and motor through said casing, means providing a liquid flow passage from the reservoir into the bottom of the casing and oil filtering means in the flow passage, said casing being filled with lubricant to the level of the lubricant in the reservoir through said passage and said pump being provided with an inlet adjacent the bottom of said casing receiving lubricant from said casing by gravity flow.

2. A reservoir, pump and pump motor unit, including a reservoir chamber, an elongated casing extending vertically through said reservoir, a small capacity pump at the lower end of the casing and a motor therefor at the upper end thereof, means providing a gravity flow passage from the reservoir into the bottom of the casing and means to vent the top of the casing, said casing being filled with lubricant to the level of the lubricant in the reservoir through said passage and said pump being provided with an inlet adjacent the bottom of said casing receiving lubricant from said casing by gravity flow.

3. A reservoir, pump and pump motor unit, including a reservoir chamber, an elongated casing extending vertically through said reservoir, a small capacity pump in the lower end of the casing and a motor therefor in the upper end thereof, means providing a gravity flow passage from the reservoir into the bottom of the casing and means to vent the top of the casing, said reservoir having a well in its bottom in which the pump is disposed, and the pump inlet ports being below the top of the well whereby complete gravity evacuation of the reservoir leaves an emergency supply at the pump.

4. A reservoir, pump and pump motor unit, including a reservoir chamber, an elongated casing extending vertically through said reservoir, a small capacity pump in the lower end of the casing and a motor therefor in the upper end thereof, means providing a gravity flow passage from the reservoir into the bottom of the casing and means to vent the top of the casing, said reservoir having a well therein and a large area, dense filter in the well and in said flow path, said casing being filled with lubricant to the level of the lubricant in the reservoir through said passage and said pump being provided with an inlet adjacent the bottom of said casing receiving lubricant from said casing by gravity flow.

5. A reservoir, pump and pump motor unit, including a reservoir chamber, an elongated casing extending vertically through said reservoir, a small capacity pump in the lower end of the casing and a motor therefor in the upper end thereof, means providing a gravity flow passage from the reservoir into the bottom of the casing and means to vent the top of the casing, said reservoir having a well therein, a large area, dense filter in the well and in said flow path, and a removable cap providing access to the filter and constituting the bottom of the well, said casing being filled with lubricant to the level of the lubricant in the reservoir through said passage and said pump being provided with an inlet adjacent the bottom of said casing receiving lubricant from said casing by gravity flow.

6. A reservoir, pump and pump motor unit, including a reservoir chamber, an elongated casing extending vertically through said reservoir, a small capacity pump in the lower end of the casing and a motor therefor in the upper end thereof, means providing a gravity flow passage from the reservoir into the bottom of the casing and means to vent the top of the casing, said reservoir having a well therein, a large area, dense filter in the well and in said flow path, and a removable cap constituting the bottom of the well and carrying the filter, the filter being cylindrical and moved into position between the casing and cap as an incident of applying the latter, said casing being filled with lubricant to the level of the lubricant in the reservoir through said passage and said pump being provided with an inlet adjacent the bottom of said casing receiving lubricant from said casing by gravity flow.

7. A reservoir, pump and pump motor unit, including a vented reservoir chamber having a filling opening therein, an elongated casing extending vertically through said reservoir, a pump of minute effective volume in the lower end of the casing and a motor in the upper end thereof, means providing a liquid flow passage from the reservoir into the bottom of the casing, the flow passage being arranged to pass oil by gravity from the reservoir chamber into the casing, and having a large area, dense filter means therein whereby a column of filtered liquid is caused to rise in the casing and immerse the pump when the reservoir is filled.

8. A reservoir, pump and pump motor unit, including a vented reservoir chamber having a filling opening therein, an elongated casing extending vertically through said reservoir, a pump at the lower end of the casing and a motor therefor at the upper end thereof, means providing a liquid flow passage from the reservoir into the bottom of the casing and means to vent the top of the casing, said casing being filled with lubricant to the level of the lubricant in the reservoir through said passage and said pump being provided with an inlet adjacent the bottom of said casing receiving lubricant from said casing by gravity flow.

9. A reservoir, pump and pump motor unit, including a vented reservoir chamber having a filling opening therein, an elongated casing extending vertically through said reservoir, a pump in the lower end of the casing and a motor therefor in the upper end thereof, means providing a liquid flow passage from the reservoir into the bottom of the casing and means to vent the top of the casing, comprising an air pervious oil filtering passageway, communicating with the top of the reservoir chamber, said casing being filled with lubricant to the level of the lubricant in the reservoir through said passage and said pump being provided with an inlet adjacent the bottom of said casing receiving lubricant from said casing by gravity flow.

10. In a pump and pump motor unit for centralized lubricating systems, an elongated casing adapted to have its lower end immersed in an oil reservoir, a reciprocating plunger pump at the lower end of the casing and an inertia weight motor therefor at the upper end thereof, said casing having a lubricant inflow passage from the reservoir in its lower end and a rod directly connecting the plunger and weight, said casing being filled with lubricant to the level of the lubricant in the reservoir through said passage and said pump being provided with an inlet adjacent the bottom of said casing receiving lubricant from said casing by gravity flow.

11. In a pump and pump motor unit for centralized lubricating systems, an elongated casing adapted to have its lower end immersed in an oil reservoir, a reciprocating plunger pump at the lower end of the casing and an inertia weight motor therefor at the upper end thereof, said casing having a lubricant inlet passage from the reservoir in its lower end and a rod directly connecting the plunger and weight, the connection between rod and plunger permitting lateral play to compensate for inaccurate alignment of the plunger and rod, said casing being filled with lubricant to the level of the lubricant in the reservoir through said passage and said pump being provided with an inlet adjacent the bottom of said casing receiving lubricant from said casing by gravity flow.

12. A pump and pump motor unit for centralized lubricating systems including an elongated casing adapted to have its lower end immersed in an oil reservoir, a reciprocating plunger pump in the lower end of the casing and an inertia weight motor therefor in the upper end thereof, said casing having a lubricant inlet passage from the reservoir in its lower end, a rod directly connecting the plunger and weight and means providing a normally immersed bearing for the rod, said casing being filled with lubricant to the level of the lubricant in the reservoir through said passage and said pump being provided with an inlet adjacent the bottom of said casing receiving lubricant from said casing by gravity flow.

13. A pump and pump motor unit for centralized lubricating systems including an elongated casing adapted to have its lower end immersed in an oil reservoir, a reciprocating plunger pump in the lower end of the casing and an inertia weight motor therefor in the upper end thereof, said casing having a lubricant inlet passage from the reservoir in its lower end, a rod directly connecting the plunger and weight and connecting rod bearings in the casing lubricated by the oil therein, said casing being filled with lubricant to the level of the lubricant in the reservoir through said passage and said pump being provided with an inlet adjacent the bottom of said casing receiving lubricant from said casing by gravity flow.

14. In a central lubricating installation for the oscillating or chassis bearings of a motor vehicle, of the type comprising a distributing piping system having resilient capacity and having highly restricted calibrated flow control fittings at the outlet branches thereof leading to said bearings; a force pump of minute capacity and energy consumption at the inlet to the system, said force pump including an elongated rod-like piston and a cylinder block provided with an elongated cylinder, a transverse inlet port intermediate of the length of said cylinder and an outlet valve at the bottom of said cylinder, an oscillating inertia motor directly connected to the piston so as to be in phase therewith and also in phase relation with the movement of said bearings, which weight is relatively so massive that the energy generated by the weight will be so great as to cause the piston to discharge the pump contents into the line substantially regardless of the varying back pressure from ½ pound to 100 pounds created therein due to varying lubricant viscosity with varying temperature, the discharges of the pump being relatively so frequent and closely spaced and so minute with respect to the resiliency of the line that each discharge will be much less than the resilient capacity of the line and a continuous flow results to the bearings throughout operation, said weight and said piston being provided with a balancing spring to locate the lower end of the piston at the transverse port when the weight and the piston are in at-rest position.

15. An oil pump and motor unit adapted for connection at its lower end with a source of oil supply, the unit including a vertical elongated casing having a motor in its top and a pump in its bottom, an oil inlet passage from the reservoir in the bottom of the casing and a vent arranged above the oil level therein, a connecting rod between motor and pump and horizontal partition members providing connecting rod bearings adapted for lubrication by the oil in the casing, said casing being filled with lubricant to the level of the lubricant in the reservoir through said passage and said pump being provided with an inlet adjacent the bottom of said casing receiving lubricant from said casing by gravity flow.

16. An inertia motor and force pump including an elongated cylinder having a plurality of spaced transverse partitions therein, a rigid connecting rod having slide bearings in said partitions, a motor above one partition including a spring supported floating inertia weight directly connected to the connecting rod, a pump below another partition including a plunger fixed to the lower end of the connecting rod, a cap closing the top of the cylinder, and said pump also including a cylinder structure at the bottom of the cylinder and provided with oil inlet and outlet openings.

17. An inertia motor and force pump including an elongated cylinder having a plurality of spaced transverse partitions therein, a rigid connecting rod having slide bearings in said partitions, a motor above one partition including a spring supported floating inertia weight rigidly fixed to the connecting rod and a pump below another partition including a plunger fixed to the lower end of the connecting rod, the weight substantially filling the cylinder whereby to provide an air checking action to damp the vibrations of the weight.

18. An oil supply unit including a reservoir and a vertically elongated casing in said reservoir, a motor in the top of the casing and a pump in the bottom thereof, an oil inlet passage from the reservoir in the bottom of the casing and a vent arranged at the top of the casing, a connecting rod between motor and pump, horizontal partition members providing connecting rod bearings, each of the partitions comprising a plate formed with a connecting rod bearing sleeve, having its edges attached to the casing and having an oil flow opening therein.

19. An oil supply unit including a reservoir and a vertically elongated casing in said reservoir, a motor in the top of the casing and a pump in the bottom thereof, an oil inlet passage from the reservoir in the bottom of the casing and a vent arranged at the top of the casing, a connecting rod between motor and pump, horizontal partition members providing connecting rod bearings, each of the partitions comprising a plate formed with a connecting rod bearing sleeve, having its edges attached to the casing and having an oil flow opening therein, the partition edges being held between partial shear cuts and indentations in the casing.

20. In a centralized lubricating system, a combined oil reservoir and feed pump unit comprising a reservoir chamber and a casing disposed therein and extending therebelow, a pump of small effective volume arranged at the lower end of said casing, a flow passage from the reservoir into the pump casing and a filter means of large effective area in said path the pump being normally immersed in filtered oil in said casing, the pump being of the self-porting plunger type and having its inlet ports arranged adjacent the bottom of and inside the casing and below the bottom of the reservoir.

21. A reservoir and pump unit including a reservoir tank having a filling opening in its top and having a sleeve pendant from its bottom, a cylinder disposed vertically of the reservoir having its upper end above the liquid level in the reservoir and its lower end extending downwardly into the sleeve and terminating above the lower end of the latter, the sleeve and cylinder providing a downflow passageway for oil from the reservoir, a cap closing the lower end of the sleeve, a pump carrying partition member substantially closing the lower end of the cylinder and having an upflow passageway therein, and filter means disposed between the partition member and the cap in advance of said upflow passageway.

22. A reservoir and pump unit including a reservoir tank having a filling opening in its top and having a sleeve pendant from its bottom, a cylinder disposed vertically of the reservoir having its upper end above the liquid level in the reservoir and its lower end extending downwardly into the sleeve and terminating above the lower end of the latter, the sleeve and cylinder providing a downflow passageway for oil from the reservoir, a cap closing the lower end of the sleeve, a pump carrying partition member substantially closing the lower end of the cylinder and having an upflow passageway therein, and filter means disposed between the partition member and the cap in advance of said upflow passageway, said filter means comprising a stack of flat washers clamped between the cap and the partition, a wire gauze core for the washers fixed to the cap at its lower end and spun over the washers at its upper end, whereby the washers and core are removable as a unit with the cap.

23. A pump and reservoir unit including a reservoir having a well therein, a pump having a pump cylinder extending above the liquid level in the reservoir and depending into the well, a flow passageway from the reservoir through the well into the cylinder, a filter in the well disposed in the path of flow to the pump and a cap constituting a removable bottom for the well and providing access to the filter.

24. A pump and reservoir unit including a reservoir having a sleeve pendant therefrom, a pump cylinder extending above the liquid level of the reservoir and depending into the sleeve, the sleeve and cylinder defining a flow passageway from the reservoir into the cylinder and a cap attached to the lower end of the sleeve and carrying a filter means for disposition in such path, the pump being mounted in a partition member in the bottom of the sleeve and below the bottom of the reservoir, the filtering means being of cylindrical form of less diameter than the sleeve and extending between the cap and the partion member.

25. A reservoir and pump unit including a reservoir tank having a filling opening therein, and having a pendant well, a cap constituting the bottom of said well, a dense cylindrical filter carried by the cap, a cylinder extending vertically through the reservoir, and into the well including a portion to engage the filter, a small capacity pump in the lower end of the cylinder and a flow passage through which oil may drain to the filter, and means providing a flow passage for filtered oil to the pump.

26. As a new article of manufacture, a pump of the unpacked self-porting plunger type including a supporting block having inlet and outlet passages therein, a pump body frictionally fitted into the block and having a central longitudinal bore plugged at its lower end, inlet port means above the block intersecting the bore, a downwardly opening outlet valve at the bottom of the bore, outlet port means in the body below said valve and an annular groove about the body intersected by said outlet port means and communicating with the outlet passages in the block.

27. As a new article of manufacture a pump including a supporting block having outlet passageways therein, and a pump body force fitted into the block, an annular channel around said body communicating with the outlet passageways in the block and intersecting outlet passageways from the pump.

28. A pumping mechanism comprising a reservoir, a pump receiving lubricant from said reservoir, and positioned adjacent the bottom of said reservoir and an inertia motor of the reciprocatory type including a motor casing, a substantially inflexible connecting rod, extending into the casing, an inertia weight fixed to the connecting rod, a coiled expansion spring supporting said weight in substantially free floating position, the cross-section of a portion of the weight being similar to the cross-section of the casing but of slightly less diameter whereby the restricted air space between the weight and the casing walls affords substantial air checking effect, said pump including a relatively long, thin, elongated metallic piston member and a connecting rod being provided connecting said weight and said piston so that they will move upwardly and downwardly together and with the same frequency.

29. In a chassis lubricating apparatus of the type including a lubricant-filled, pressure tight distributing conduit system, highly restricted flow-controlling outlets at the points of lubricant delivery; an automatic supply installation comprising a reservoir, a force pump of minute volume deriving its charge from the reservoir and feeding it into the distributing system, said pump being provided with a piston and an inertia motor deriving energy from vehicle vibration and including an inertia weight as the power element, said weight being directly connected to the piston of the force pump whereby minute charges of lubricant are forced into the system at rapidly succeeding intervals to maintain a substantially continuous and relative slow flow from the outlets during operation of the vehicle, and adjustment means permitting initial predetermination of the maximum effective stroke of the pump said force pump being of the ported pump variety, and said adjustment means enabling adjustment of the piston to just close said inlet port when the inertia weight is in at-rest position.

30. An automatic supply installation including a reciprocatory plunger pump of small effective volume and an inertia motor for operating the pump, a connecting rod extending between and being attached to the plunger and the motor for causing reciprocation of the plunger upon actuation of the motor and adjustment means being provided at the attachment of the connecting rod to the motor enabling adjustment of the working stroke of the pump and the normal at-rest position of the plunger.

31. In a central lubricating installation, of the type comprising distributing piping having highly restricted calibrated flow control fittings at the outlet branches thereof; an automatic supply installation comprising a force pump of minute capacity and energy consumption at the inlet to the system, an inertia motor including a weight directly connected to the expelling element of the pump so as to be continuously in phase therewith, which weight is so massive relatively to the operative area of said expelling element that the motor at all times will create energy tremendously greater than the energy absorbed by the pump, said pump being provided with an elongated cylinder intermediately provided with an inlet port, the upper portion of the cylinder serving as a guide for the expelling element and the lower portion of the cylinder serving to receive the lubricant to be discharged by said expelling element to just close said inlet port when the pump is in at-rest position.

32. In a lubricating installation, a reservoir-pump combination, comprising a reservoir casing, a pump mechanism positioned adjacent the bottom of the casing, a passageway from the casing to the pump mechanism, and a cylindrical strainer concentric with and below said pump mechanism across said passageway.

33. In a lubricating installation, a reservoir-pump combination, comprising a reservoir casing, a pump positioned adjacent the bottom of the casing, a well in the bottom of the casing associated with the pump, a removable cap closing the bottom of said well, and a cylindrical replaceable strainer positioned between the pump and the cap in said well.

34. In a lubricating installation, a reservoir-pump combination, comprising a reservoir casing, a pump positioned adjacent the bottom of said casing having an elongated longitudinal body, a sleeve depending from said casing and encircling said pump body, and an annular plug for the bottom of said sleeve, said plug being in turn plugged by said pump body.

35. In a lubricating installation, a reservoir-pump combination, comprising a reservoir casing and a pump mechanism positioned adjacent the bottom thereof, said pump mechanism including a pump cylinder provided with an inlet and an outlet and receiving a piston, an outlet valve associated with said cylinder outlet, and a conduit parallel to the pump cylinder, leading from said casing to said inlet in the direction of discharge of the piston.

36. In a lubricating installation, a reservoir-pump combination, comprising a reservoir casing, and a pump mechanism positioned adjacent the bottom of the casing, said mechanism including a pump cylinder with an inlet and an outlet and receiving a piston, inlet conduits extending along and outside of said cylinder first in the direction of discharge and then in the direction of charge of the piston to adjacent the inlet, and additional conduits transverse to said inlet conduits communicating with said outlet.

37. In a lubricating installation, a reservoir-pump combination, comprising a reservoir casing, and a pump mechanism positioned adjacent the bottom of said casing, said mechanism comprising a pump body with a pump bore and with inlet and outlet bores communicating with said pump bore, and a supporting body encircling the pump body provided with inlet and outlet bores communicating respectively with the inlet and outlet bores of the pump body.

38. In a lubricating installation, a reservoir-pump combination, comprising a reservoir casing, and a pump arrangement positioned adjacent the bottom of the casing, comprising a pump body and intercommunicating pump inlet compartments on both sides of said pump body, one of which compartments is positioned above the other and adapted to receive lubricant which wells up from the other, and the lower of which compartments receives lubricant by gravity flow from the casing.

39. In a lubricating installation, a reservoir-pump combination, comprising two lubricant reservoirs including an outside casing and an inside casing enclosed in said outside casing, the inside casing for cleansed lubricant and the outside casing for uncleansed lubricant, a pump associated with the reservoir having the cleansed lubricant and being adapted to receive its lubricant supply therefrom, a liquid conduit leading from the uncleansed to the cleansed lubricant reservoir, and a lubricant cleansing device cleansing the lubricant passing through said conduit.

40. In a lubricating installation, a reservoir-pump combination, comprising two lubricant reservoirs, one for cleansed lubricant and one for uncleansed lubricant, a pump associated with the reservoir having the cleansed lubricant and being adapted to receive its lubricant supply therefrom, a liquid conduit leading from the uncleansed to the cleansed lubricant reservoir, and a lubricant cleansing device in said conduit, the cleansed lubricant reservoir being enclosed within the uncleansed lubricant reservoir and the conduit between said reservoirs extending therebelow.

41. In a lubricating installation, a reservoir-pump combination, comprising a reservoir casing, a filler opening positioned in the top of said casing, a subsidiary motor casing positioned on top of said reservoir casing and spaced from said filler opening, a motor enclosed within said casing, a pump positioned adjacent the bottom of the reservoir casing actuated by said motor, and a vent from said motor casing to said reservoir casing, said motor casing, said reservoir casing, and said opening being so arranged and constructed that the motor casing will be substantially above the lubricant level in the reservoir casing.

GEORGE BIJUR,
*Executor of the Estate of Joseph Bijur, Deceased.*